March 25, 1930.  H. R. ONG  1,751,711

REVOLVING LATHE CENTER

Filed May 27, 1927

INVENTOR
H. R. ONG

ATTORNEYS

Patented Mar. 25, 1930

1,751,711

UNITED STATES PATENT OFFICE

HAROLD RAY ONG, OF CHAMPAIGN, ILLINOIS

REVOLVING LATHE CENTER

Application filed May 27, 1927. Serial No. 194,774.

My invention relates to improvements in lathe centers, and it consists in the combinations, constructions, and arrangements herein described and claimed.

An object of my invention is to provide a lathe center for the tail spindle of a lathe, which, instead of being stationary, is free to revolve, thereby eliminating heating and burning of wood, where the device is used in wood turning, requiring less energy to run the lathe, and permitting continuous operation.

A further object is to provide a revolving lathe center which is constructed in such a manner that a lubricant, such as grease or oil, is carried without a possibility of leakage.

A further object is to provide a device of the type described in which longitudinal movement of the center is obviated and in which any possibility of lateral motion to cause wabbling is eliminated.

Other objects and advantages will appear in the following specification, and the novel features of the invention will be particularly pointed out in the appended claim.

Figure 1:
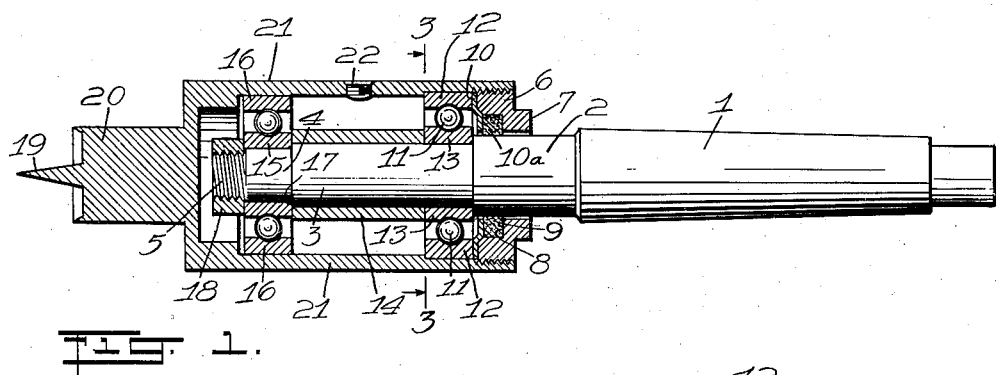
Figure 2:
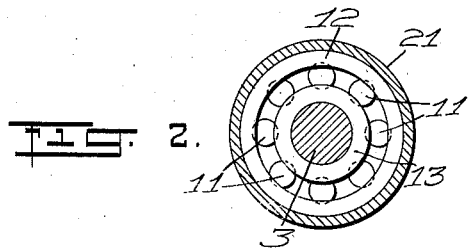

My invention is illustrated in the accompanying drawings, forming part of this application, in which Figure 1 is a sectional view of one form of the device, and Figure 2 is a section along the line 2—2 of Figure 1.

Referring now to Figure 1, I have shown therein an arbor 1, which is tapered so as to fit into the spindle of the tailstock of a lathe, not shown. The arbor is provided with portions which are reduced successively, as shown at 2, 3, 4 and 5, the latter being threaded. On the portion 2 is a threaded closure plug 6, having a projection 7, by means of which it may be turned with a wrench. This plug is provided with a recess 8 in which a felt washer 9 is disposed. A cup-shaped metal washer 10 bears on the felt washer, as shown at 10ª. Contiguous to the metal washer 10 is a ball race having an outer portion 12 and an inner portion 13, between which the balls 11 are held. It will be noted that the outer portion 12 of the race bears against the metal washer, but that the inner portion of the race is spaced from the washer, being frictionally held on the portion 3 of the arbor.

A spacing sleeve 14 is provided which bears at one end against the member 13 of the ball bearing assembly. A second ball bearing assembly, similar to the first and consisting of the inner portions 15 and outer portion 16, is disposed on the reduced portion 4 of the arbor, the inner portions 15 bearing against a shoulder 17 formed by the reduced portion 4. A nut 18 holds the inner portions 15 of the bearing securely in position.

The center proper consists of a tapered portion 19 carried by a body 20, and the latter has at one end thereof an integral sleeve 21, which is threaded at one end to receive the threaded plug 6 and which has an opening normally closed by a plug 22.

From the foregoing description of the various parts of the device, the operation thereof may be readily understood. In assembling the device, the plug 6 is first placed on the arbor with its felt washer, the washer 10 is placed in position, the bearing assembly 11, 12 and 13, the sleeve 14, the bearing assembly 15, 16, and the nut 18. The sleeve 21 is then slipped over the assembled portions until the shoulder 21ˣ engages the bearing member 13. The plug 6 is then screwed in tightly, thus firmly clamping the metal washer 10 in place. The plug 22 is removed, and the interior of the structure is filled with oil, when the plug is again screwed in place.

It will be seen that with the construction as described above, longitudinal play is obviated, since when a thrust comes on the center portion 19, it is transmitted through the sleeve 21 to the bearing portion 12 where it is received by the balls 11 and transmitted to the bearing portion 13 which is held by the shoulder of the reduced portion 3. Lateral movement is prevented so that there is no wabbling.

In cases where work turns on a stationary center, there is considerable friction which causes heating of the center and the material being worked on, and in some cases is sufficient to cause the lathe to stop, and it is also necessary to stop it frequently and lubricate the center.

It will be noted that in my device, provision is made for the holding of the lubricant without the possibility of the latter working out. Since the center revolves and the friction is greatly reduced, the energy required to operate a lathe is very much less than where the center is stationary. The lathe may be operated at a higher speed, and continuously; thus enabling one to finish a given piece of work in much less time.

I claim:

A lathe center construction comprising a stationary spindle having a pair of reduced portions and a threaded end, ball bearings mounted upon each of the reduced portions, a sleeve disposed upon the spindle between said bearings and in engagement therewith, a nut disposed upon the threaded portion and bearing against one of said ball bearings for securing the ball bearings to the spindle, a lathe center mounted for rotation about the ball bearings and having a threaded opening disposed concentrically with respect to the stationary spindle, a closure plug having a recess and being threaded for engaging the threaded portion of the lathe center, oil retaining means disposed within said recess and arranged to bear against a portion of the spindle, and a rigid washer disposed between one of said ball bearings and the closure plug and being arranged to bear against the oil retaining means for retaining the latter.

HAROLD RAY ONG.